United States Patent Office 3,639,434
Patented Feb. 1, 1972

3,639,434
17-ACYLOXYSTEROIDS AND THEIR MANUFACTURE
Peter Oxley and John Rosindale Housley, Nottingham, England, assignors to Boots Pure Drug Company Limited, Nottingham, England
No Drawing. Filed Feb. 2, 1967, Ser. No. 613,454
Int. Cl. C07c *169/32*
U.S. Cl. 260—397.45                                    2 Claims

ABSTRACT OF THE DISCLOSURE

The invention concerns novel steroids having valuable properties as anti-inflammatory agents in veterinary and human medicine.

The new steroids are $17\alpha$ - acyloxy-$\beta$-hydroxy progresterones and their $\Delta^1$, $\Delta^6$, $\Delta^{1,6}$, 21-halo-$\Delta^1$ and 21-halo-$\Delta^{1,6}$ derivatives.

Processes for their preparation include the conversion of a compound of the general Formula II into the corresponding $11\beta$-nitrate ester III,

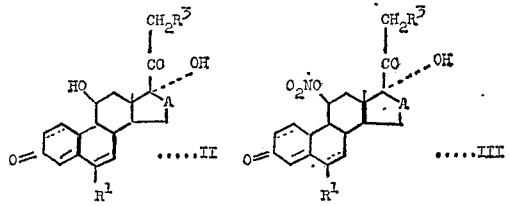

where $R^3$ is chlorine, bromide, alkanoyloxy, an alkanesulphonyloxy- or arenesulphonyloxy-group and $R^1$, A and the symbol ══ are as hereinbefore defined, and thereafter (a) replacing the group $R^3$ by hydrogen, then converting the $17\alpha$-hydroxyl group into the group $O.COR^2$ and finally reducing the $11\beta$-nitrate group to an $11\beta$-hydroxyl group; or (b) converting the $17\alpha$-hydroxyl group into the group $O.COR^2$, then reducing the $11\beta$-nitrate group to an $11\beta$-hydroxyl group and finally replacing the group $R^3$ by hydrogen; or (c) converting the $17\alpha$-hydroxyl group into the group $O.COR^2$, then replacing the group $R^3$ by hydrogen and finally reducing the $11\beta$-nitrate group to an $11\beta$-hydroxyl group.

---

This invention relates to esters of steroids and processes for preparing them. More particularly it relates to the preparation of $17\alpha$ - acyloxy-$11\beta$-hydroxy-progesterones and their $\Delta^1$-, $\Delta^6$- and $\Delta^{1,6}$-derivatives. The invention also relates to novel $17\alpha$-acyloxy-$11\beta$-hydroxy-progesterones and their $\Delta^1$-, $\Delta^6$- and $\Delta^{1,6}$- derivatives and to therapeutic compositions thereof. The invention also relates to a method of treating inflammation, especially inflammation of the skin in animals including man.

The use of corticosteroids in the treatment of inflammatory conditions by oral, parenteral or topical administration is well-known. It has recently been discovered that the topical anti-inflammatory activity of steroids may be enhanced by acylation of the $17\alpha$-hydroxyl group, a particularly active example of this type of compound being betamethasone $17\alpha$-valerate. Many anti-inflammatory steroids contain $11\beta$-hydroxyl groups in the molecule and although methods are available for preparing $17\alpha$-acyloxy-derivatives of $11\beta$-hydroxy-steroids in which there is also a 21-hydroxyl group, e.g. by hydrolysis of the $17\alpha$-21-ortho-ester, there is no method generally applicable to all $11\beta,17\alpha$-dihydroxy-steroids. This is because of the similar reactivities of the $11\beta$-hydroxy group and the $17\alpha$-hydroxyl group.

In British patent application 6,215/65 we have claimed a process for preparing 17-esters of $11\beta,17\alpha$-dihydroxy-pregnanes having a substituent at $C_{21}$ comprising protecting the $11\beta$ - hydroxyl substituent with a nitrate ester group, acylating the $17\alpha$-hydroxyl group, removing the $11\beta$ - protecting group by a non-hydrolytic process and isolating the $17\alpha$-acyloxy-$11\beta$-hydroxy-steroid.

Although this process may be applied to $11\beta,17\alpha$-dihydroxyprogesterones, there is much less difference between the reactivity of the $11\beta$- and $17\alpha$-hydroxyl groups in pregnanes without a $C_{21}$ substituent; it is difficult to separate the $11\beta$-nitrate from the $17\alpha$-nitrate and the $11\beta,17\alpha$-dinitrate which is the major product. Economic yields of $17\alpha$ - acyloxy - $11\beta$ - hydroxyprogesterones cannot be achieved by this method.

We have now discovered novel processes for preparing $17\alpha$-acyloxy-$11\beta$-hydroxy steroids of the pregnane series. We have also discovered novel $17\alpha$-acyloxy-$11\beta$-hydroxy-progesterones having valuable therapeutic activity.

According to the present invention there is provided a process for preparing a compound of the general Formula I.

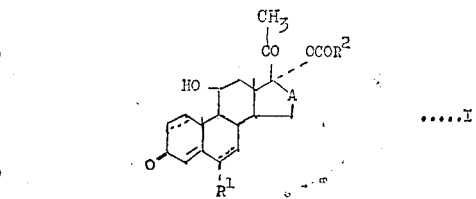

where the bonds marked ══ may be either a single or a double bond. A represents the groups

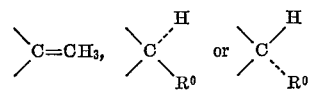

where $R^0$ is hydrogen, acyloxy, fluorine, chlorine or methyl, $R^1$ is hydrogen, fluorine or methyl optionally substituted by one or more fluorine atoms, and $R^2$ is alkyl optionally substituted by halogen, an alkoxy or an aryl group, or $R^2$ is cycloalkyl, alkenyl, an optionally substituted aryl or heterocyclic group; comprising converting a compound of the general Formula II into the corresponding $11\beta$-nitrate ester III,

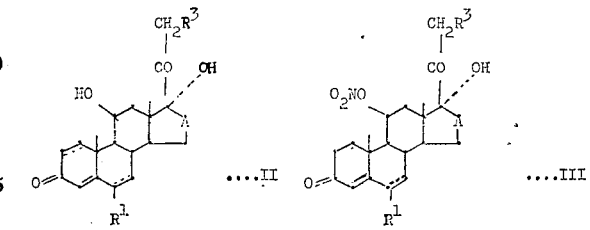

where $R^3$ is chlorine, bromine, alkanoyloxy, an alkanesulphonyloxy- or arenesulphonyloxy-group and $R^1$, A and the symbol ══ are as hereinbefore defined, and thereafter (a) replacing the group $R^3$ by hydrogen, then converting the $17\alpha$-hydroxyl group into the group $O \cdot COR^2$ and finally reducing the $11\beta$-nitrate group to an $11\beta$-hydroxyl group; or
(b) converting the $17\alpha$-hydroxyl group into the group $O \cdot COR^2$, then reducing the $11\beta$-nitrate group to an $11\beta$-hydroxyl group and finally replacing the group $R^3$ by hydrogen; or
(c) converting the $17\alpha$-hydroxyl group into the group $O \cdot COR^2$, then replacing the group $R^3$ by hydrogen and finally reducing the 11β-nitrate group to an 11β-hydroxyl group.

Under certain reaction conditions replacement of the R³ group by hydrogen and reduction of the 11β-nitrate group in steps (b) and (c) may take place simultaneously.

There are also provided novel therapeutic compositions containing as active ingredient a compound of the general Formula IV:

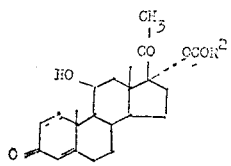

where R² and the symbol $=\!=\!=$ are as hereinbefore defined provided that at least one of the 1,2- and 6,7-linkages is a double bond, in association with a pharmaceutically acceptable diluent or carrier.

There are also provided novel intermediates comprising prednisolone 11β-nitrate and compounds of general Formula V;

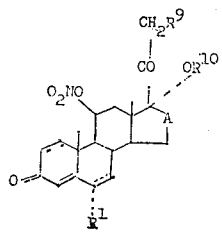

where R⁹ is hydrogen, bromine or iodine, R¹⁰ is hydrogen or the group —COR², and R¹, R², A and the symbol $=\!=\!=$ are as hereinbefore defined.

There are also provided novel compounds of general Formula IV with the exception of 21 desoxy-prednisolone 17α-acetate.

Preferred compounds of general Formula IV are those in which R² is alkyl ($C_2$–$C_4$).

The nitrate ester group, of compounds of general Formula III, which is conveniently introduced by the action of acetyl nitrate, a reagent produced by mixing fuming nitric acid with acetic anhydride, is most conveniently transformed into hydroxyl by reduction with zinc and acetic acid.

The acylation of the 17α-hydroxy group may be achieved by reaction with an alkanoic acid anhydride $(R^2CO)_2O$ or an acid halide $R^2COX$ where X is chlorine or bromine in the presence of a suitable strong acid catalyst. The preferred catalyst is p-toluenesulphonic acid but acids such as perchloric acid are also suitable. The acylation may also be catalysed by bases such as triethylamine. Another method of acylation employs an alkanoic acid $R^2COOH$ in the presence of trifluoroacetic anhydride. 17α-acetates only may be prepared by reaction of the 17α-hydroxy compound with ketene, preferably in the presence of an acid catalyst.

The group R³ is replaced by hydrogen using conventional methods. For example, a preferred group is the methanesulphonyloxy-group which is readily reduced with sodium iodide and acetic acid. When R³ is chlorine, bromine or iodine the halogen may be replaced with hydrogen using zinc and acetic acid.

For convenience, compounds of general Formula IV are referred to as 21-desoxyhydrocortisones and 21-desoxyprednisolones hereafter.

The compounds of general Formula IV have been found to have valuable anti-inflammatory activity and to be particularly valuable for topical application. For example we have tested 21-desoxyprednisolone 17α-propionate by the McKenzie test (Archives of Dermatology, 1962, 86, 608–610) and found it to be several times as active as triamcinolone acetonide, a commercially available steroid for topical application. The unacylated steroid, 21-desoxyprednisolone, however, is virtually inactive in the McKenzie test.

In the following typical reaction schemes, the preparation of 21-desoxyprednisolone series is illustrated but this is not to be construed as limiting and is by way of example only.

The compound VI may be converted into the 11-nitrate VII by treatment with acetyl nitrate. This compound may be converted into the 21-desoxy-compound VIII, which in turn is acylated to give the 17-acylate IX. This compound may also be prepared by converting compound VII into the 17-acylate, X and subsequently treating with sodium iodide in acetic acid to give the compound IX. Compound IX is finally converted into compound XI by treatment with zinc dust and acetic acid. Compound X may also be reduced with zinc and acetic acid to give compound XII which gives compound XI when treated with sodium iodide in acetic acid. In another modification, prednisolone 21-acetate (XIII) may be converted into the 11β-nitrate (XIV) which is then hydrolysed to prednisolone 11β-nitrate (XV). Compound XV is converted into compound VII by reaction with methanesulphonyl chloride in the presence of a base such as pyridine. Compound X may be converted into the corresponding 21-iodide which may be reduced to compound XI using zinc dust and acetic acid. Similarly, compound XII may be converted into the corresponding 21-iodide which may be reduced to compound XI.

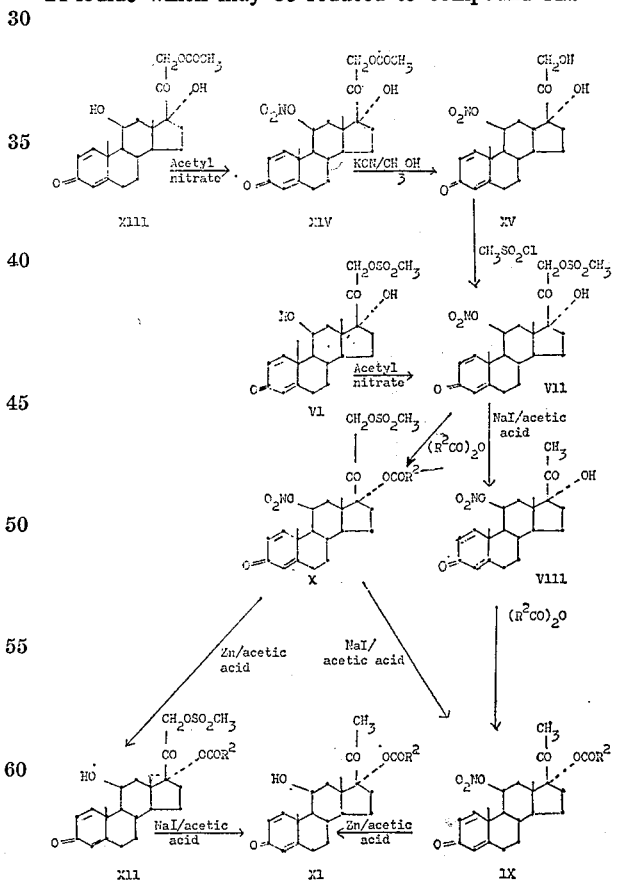

In an alternative process prednisolone 17-acylates (XVI) are converted into the 21-methanesulphonates (XII) which are treated with sodium iodide and acetic acid to give the corresponding 21-desoxy-17-acylates (XI). Alternatively, the compounds XII may be converted into the 21-chloro-compounds (XVII) by treatment with lithium chloride in dimethylformamide; these compounds are reduced, for example with zinc dust and acetic acid, to give the compounds XI.

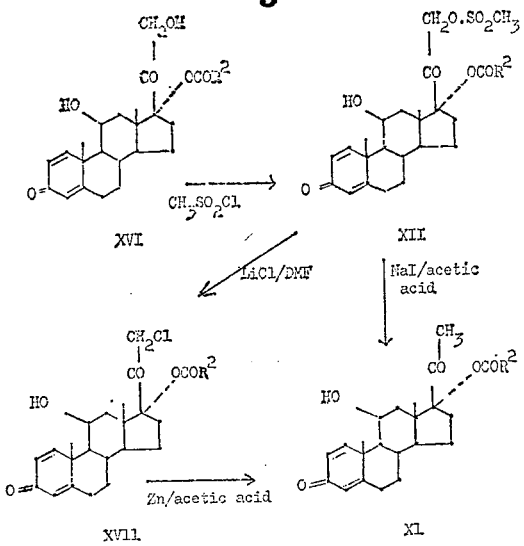

In another method of preparation, prednisolone (XVIII) is converted into its 21-methanesulphonate (VI) which is treated with lithium chloride in dimethylformamide to give the corresponding 21 - chloro-compound (XIX). Treatment with acetyl nitrate gives the 11-nitrate (XX) which is treated with an acid anhydride $(R^2CO)_2O$ in the presence of p-toluenesulphonic acid to give the 17-esters (XXI). Reduction with zinc dust and acetic acid gives the corresponding 21-desoxy - 17 - acylates (XI). Prednisolone 21-bromide may be converted into the 21-desoxy-17-acylates (XI) by a similar process.

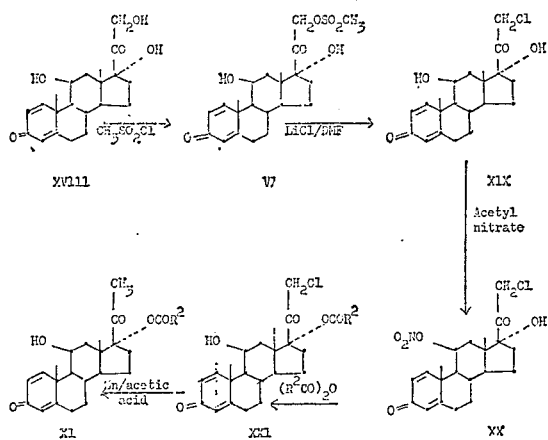

In a further process compounds of the general Formula XI may be prepared by reduction of a 9α-halo-compound (XXII) with chromous acetate in the presence of an alkane thiol and preferably in dimethylsulphoxide as solvent.

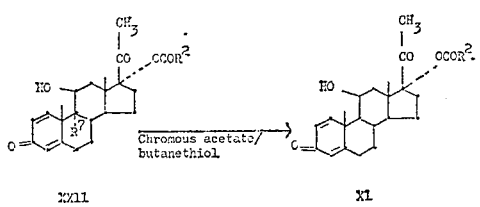

where $R^7$ is chloride or bromine and $R^2$ is as hereinbefore defined.

The hydrocortisones or the Δ⁴-analogues of the prednisolone series exemplified in these typical reaction schemes using 11β-nitrate intermediates may be made by similar reactions but starting with a Δ⁴-steroid instead of a Δ¹,⁴-steroid. The intermediates and the final products of the above typical reaction schemes in the hydrocortisone series may be dehydrogenated at $C_1$ and $C_2$ by conventional methods, for example microbiological oxidation provided that $R^0$ is not acyloxy. Suitable organisms for such dehydrogenation at $C_1$ and $C_2$ include *Corynebacterium simplex*, *Bacillus sphaericus* and *Septomyxa affinis*. Unsaturation at $C_1$ and $C_2$ may also be introduced by chemical oxidation, an especially useful dehydrogenating agent being 2,3-dichloro-5,6-dicyanobenzoquinone.

The compounds of the hydrocortisone and prednisolone series are most conveniently converted into the corresponding Δ⁴,⁶- and Δ¹,⁴,⁶-compounds respectively by chemical dehydrogenation using tetrachlorobenzoquinone.

The preferred compositions according to the present invention comprising a compound of general Formula IV in association with a pharmaceutically acceptable diluent are those adapted for topical application although the invention is not to be considered to be limited to such compositions. Such compositions may be in the form of liquid solutions or suspensions or in the form of semi-solid creams and ointments.

The compositions may also contain additional therapeutic agents which are compatible with the compounds of general Formula IV and which are pharmaceutically acceptable. Particularly valuable additional therapeutic agents include antibacterial agents such as neomycin, 2-bromo-2-nitropropane-1,3-diol, 5-chloro - 8 - hydroxy-7-iodoquinoline and 5,7-dichloro-8-hydroxyquinoline.

The following non-limitative examples illustrate the invention. For convenience, trade names are used for certain materials and these are identified as follows:

Florisil—Registered trademark for a synthetic magnesia/silica gel adsorbent.
Kieselgel G—A trade name for a silica gel adsorbent.
Polawax—A trade name for a polyoxyethylene sorbitan ester emulsifying agent.
Freon 11—A trade name for the propellant trichlorofluoromethane.
Freon 12—A trade name for the propellant dichlorodifluoromethane.
Freon 114—A trade name for the propellant 1,2-dichloro-1,1,2,2-tetrafluoroethane.

The content of the ingredients of compositions is percent w./w. unless there is a statement to the contrary.

EXAMPLE 1

Prednisolone 21-methanesulphonate (10 g.) was added to a stirred solution of acetyl nitrate at 0° C. prepared from glacial acetic acid (100 ml.) acetic anhydride (100 ml.) and fuming nitric acid (20 ml.). The steroid had dissolved after 1½ hours and after 4 hours the mixture was poured into ice/water (1000 ml.). The product was collected in methylene chloride, the extract was washed with water, dried and evaporated. The residue was crystallised from benzene to give a benzene solvate of prednisolone 21-methanesulphonate 11β-nitrate, M.P. 175–177° C. (dec.).

Prednisolone 21-methanesulphonate 11β-nitrate (4 g.) dissolved in acetic acid (80 ml.) was stirred with sodium iodide (8 g.) at room temperature for 1 hour. 5% sodium bisulphite solution (80 ml.) was added to the mixture followed by water (80 ml.) until a slight turbidity was apparent. The product crystallised on seeding to give 21-desoxyprednisolone 11β-nitrate, M.P. 144–145° C. (dec.). It was used for esterification without further purification.

Toluene-p-sulphonic acid (50 mg.) was dissolved in isobutyric anhydride (2 ml.), 21-desoxyprednisolone 11β-nitrate (500 mg.) was added and the suspension was warmed to 80° C. for 30 minutes. The clear solution was cooled and the crystals which separated were collected and washed with ether to give 21-desoxyprednisolone 17α-isobutyrate 11β-nitrate, M.P. 195–196° C. (dec.), $[\alpha]_D$ +76.1° (chloroform). Found (percent): C, 65.5; H, 7.1. $C_{25}H_{33}NO_7$ requires (percent): C, 65.3; H, 7.2.

The above compound (400 mg.) was dissolved in acetic acid (20 ml.) and stirred for 15 minutes with zinc dust (2 g.). The mixture was filtered, the filtrate was diluted with water and the product was collected in benzene. The solution was washed with water, evaporated to dryness and the residue was triturated with ether. Further purification by chromatography gave 21-desoxyprednisolone 17α-isobutyrate, M.P. 220–221° C., $[\alpha]_D$ +33.2° (chloroform). Found (percent): C, 72.4; H, 8.4. $C_{25}H_{34}O_5$ requires (percent): C, 72.4; H, 8.3.

In a similar way there were prepared:

21-desoxyprednisolone 11β-nitrate 17α-propionate, M.P. 205° C. (dec.), $[\alpha]_D$ +69.5° (chloroform).

21-desoxyprednisolone 17α-propionate, M.P. 228–229° C., $[\alpha]_D$ +34.0° (chloroform). (Found (percent): C, 72.0; H, 8.2. $C_{24}H_{32}O_5$ requires (percent): C, 72.0; H, 8.0.)

21-desoxyprednisolone 11β-nitrate 17αpivalate, M.P. 197–198° C. (dec.), $[\alpha]_D$ +67.3° (chloroform).

21-desoxyprednisolone 17α-pivalate, M.P. 270–271° C., $[\alpha]_D$ +33.0° (chloroform). (Found (percent): C, 72.5; H, 8.7. $C_{26}H_{36}O_5$ requires (percent): C, 72.9; H, 8.5.)

21-desoxyprednisolone 11β-nitrate 17α-valerate.

21-desoxyprednisolone 17α-valerate, M.P. 200° C., $[\alpha]_D$ +31.9° (chloroform). (Found (percent): C, 72.7; H, 8.5. $C_{26}H_{36}O_5$ requires (percent): C, 72.9; H, 8.5)

21-desoxyprednisolone 17α-hexanoate 11β-nitrate.

21-desoxyprednisolone 17α-hexanoate, M.P. 158–159° C., $[\alpha]_D$ +30.7° (chloroform). (Found (percent): C, 73.7; H, 8.9. $C_{27}H_{38}O_5$ requires (percent): C, 73.3; H, 8.7.)

21-desoxyprednisolone 17α-cyclobutanecarboxylate 11β-nitrate, M.P. 203–204° C. (dec.), $[\alpha]_D^{23}$ +67° (chloroform. (Found (percent): C, 66.3; H, 7.3; N, 2.7. $C_{26}H_{33}NO_7$ requires (percent): C, 66.2; H, 7.1; N, 3.0.)

21-desoxyprednisolone 17α-cyclobutanecarboxylate M.P. 266–269° C. (dec.), $[\alpha]_D^{23}$ +34° (chloroform). (Found (percent): C, 73.6; H, 8.1. $C_{26}H_{34}O_5$ requires (percent): C, 73.2; H, 8.0.)

21-desoxyprednisolone 17α-cyclopropanecarboxylate 11β-nitrate M.P. 200° C. (dec.), $[\alpha]_D^{24}$ +57° (chloroform). (Found (percent): C, 65.4; H, 7.0; N, 2.8. $C_{25}H_{31}NO_7$ requires (percent): C, 65.6; H, 6.8; N, 3.1.)

21 - desoxyprednisolone 17α - cyclopropanecarboxylate M.P. 255–257° C. (dec.), $[\alpha]_D^{25}$ +26° (chloroform). (Found (percent): C, 72.7; H, 7.9. $C_{25}H_{32}O_5$ requires (percent): C, 72.8; H, 7.8.)

21-desoxyprednisolone 17α - methoxyacetate 11β - nitrate M.P. 164–165° C., $[\alpha]_D^{26}$ +62° (chloroform). (Found (percent): C, 62.5; H, 6.8; N, 2.9. $C_{24}H_{31}NO_8$ requires (percent): C, 62.5; H, 6.8; N, 3.0.)

21 - desoxyprednisolone 17α - methoxyacetate, M.P. 230–232° C., $[\alpha]_D^{24}$ +29° (chloroform). (Found (percent): C, 68.8; H, 7.9. $C_{24}H_{32}O_6$ requires (percent): C, 69.2; H, 7.8.)

21-desoxyprednisolone 17α-benzoate 11β-nitrate M.P. 200–202° C. (dec.). (Found (percent): C, 67.0; H, 6.3; N, 2.7. $C_{28}H_{31}NO_7$, ½$H_2O$ requires (percent): C, 66.9; H, 6.4; N, 2.8.)

21-desoxyprednisolone 17α-benzoate M.P. 279–280 C., $[\alpha]_D^{25}$ −2° (chloroform). (Found (percent): C, 74.6; H, 7.3. $C_{28}H_{32}O_5$ requires (percent): C, 75.0; H, 7.2.)

21-desoxyprednisolone 17α-crotonate 11β - nitrate M.P. 175–177° C. (dec.), $[\alpha]_D^{22}$ +39° (chloroform). (Found (percent): C, 66.0; H, 6.7. $C_{25}H_{31}NO_7$ requires (percent): C, 65.6; H, 6.8.)

21-desoxyprednisolone 17α-crotonate M.P. 275–276° C. (dec.), $[\alpha]_D^{23}$ +10° (chloroform). (Found (percent): C, 73.1; H, 7.9. $C_{25}H_{32}O_5$ requires (percent): C, 72.8; H, 7.8.)

21-desoxyprednisolone 17α-acrylate 11β-nitrate M.P. 213–215° C. (dec.), $[\alpha]_D^{23}$ +69° (chloroform). (Found (percent): C, 64.9; H, 6.8. $C_{24}H_{29}NO_7$ requires (percent): C, 65.0; H, 6.6.)

21-desoxyprednisolone 17α-acrylate M.P. 245–247° C. $[\alpha]_D^{24}$ +2° (chloroform). (Found (percent): C, 69.4; H, 7.6. $C_{24}H_{30}O_5.H_2O$ requires (percent): C, 69.2; H, 7.8.)

21-desoxyhydrocortisone 11β-nitrate M.P. 171–174° C., $[\alpha]_D^{23}$ +179° (chloromorm). (Found (percent): C, 64.3; H, 7.6; N, 3.9; $C_{21}H_{29}NO_6$ requires (percent): C, 64.4; H, 7.5; N, 3.6.)

21-desoxyhydrocortisone 11β-nitrate 17α-propionate.

21-desoxyhydrocortisone 17α-propionate M.P. 225–228° C., identical with that prepared by the method of Example 2.

21-desoxy-16α-methylhydrocortisone 11β - nitrate, M.P. 169–170° C.

21-desoxy-16α-methylhydrocortisone 11β - nitrate 17α-propionate.

21-desoxy-16α - methylhydrocortisone 17α - propionate, M.P. 244–249° C. (Found (percent): C, 72.2; H, 8.6. $C_{25}H_{36}O_5$ requires (percent): C, 72.1; H, 8.7.)

21-desoxy-6α-methylprednisolone 11β-nitrate M.P. 190° C. (dec.), $[\alpha]_D$ +100° (chloroform). (Found (percent): C, 65.6; H, 7.4. $C_{22}H_{29}NO_6$ requires (percent): C, 65.5; H, 7.2.)

21-desoxy-6α - methylprednisolone 11β - nitrate 17α - propionate.

21-desoxy-6α-methylprednisolone 17α - propionate, M.P. 222–223° C., $[\alpha]_D$ +20.5° (chloroform). (Found (percent): C, 71.9; H, 8.3. $C_{25}H_{34}O_5$ requires (percent): C, 72.4; H, 8.3.)

21-desoxy-6α-methylprednisolone 17α-acetate 11-β-nitrate.

21-desoxy-6α-methylprednisolone 17α-acetate, M.P. 249–250° C., $[\alpha]_D$ +22.3° (chloroform). (Found (percent): C, 72.0; H, 8.2. $C_{24}H_{32}O_5$ requires (percent): C, 72.0; H, 8.0.)

21-desoxy - 6α - methylprednisolone 17α - isobutyrate 11β-nitrate.

21-desoxy-6α-methylprednisolone 17α-isobutyrate, M.P. 194–195° C., $[\alpha]_D$ +21.5° (chloroform). (Found (percent): C, 72.5; H, 8.2. $C_{26}H_{36}O_5$ requires (percent): C, 72.9; H, 8.5.)

EXAMPLE 2

A mixture of prednisolone (20 g.), methyl orthophenylacetate (24 ml.), and dimethylformamide (24 ml.) was heated to 140° C., treated with p-toluene-sulphonic acid (240 mg.) and distilled slowly in vacuo for 15 minutes. Pyridine (1 ml.) was added and the solvents were removed by distillation in vacuo. The solid obtained after trituration with acetone was recrystallised from chloroform-methanol to give rods of prednisolone 17α,21-methyl orthophenylacetate, M.P. 198–199° C., $[\alpha]_D^{21}$ +101° (dioxan, c.=1.06). (Found (percent): C, 73.15; H, 7.5. $C_{30}H_{36}O_6$ requires (percent): C, 73.2; H, 7.4.)

A suspension of this compound (2 g.) in methanol (20 ml.) was warmed to 45° C., and treated with M-oxalic acid (3 ml.). After 5 minutes at 45–48° C., the solution was diluted with water and the oily product isolated with methylene chloride. Crystallisation from acetone/ether gave needles of prednisolone 17α-phenylacetate, M.P. 175–177° C., $[\alpha]_D^{22}$ +23° (dioxan, c.=1.055). (Found (percent): C, 73.0; H, 7.2. $C_{29}H_{34}O_6$ requires (percent): C, 72.8; H, 7.2.)

A mixture of this compound (7 g.) and dry pyridine (30 ml.) was cooled to 0° C. and treated with methanesulphonyl chloride (1.6 ml.). After 5 hours at room temperature the mixture was diluted with water and the product isolated with methylene chloride. Crystallisation from methylene chloride/acetone gave elongated prisms of prednisolone 21-methanesulphonate 17α-phenylacetate, M.P. 207–208° C. (dec.), $[\alpha]_D^{22}$ +37° (dioxan, c.=1.1). (Found (percent): C, 64.7; H, 6.6. $C_{30}H_{36}O_8S$ requires (percent): C, 64.7; H, 6.5.)

A mixture of this steroid (500 mg.), sodium iodide (2 g.) and glacial acetic acid (24 ml.) was heated on the steam bath for 24 hours. After dilution with 2% aqueous sodium thiosulphate, the product was isolated with chloroform and crystallised from acetone/ether/hexane to give flat prisms of 21-desoxyprednisolone 17α-phenylacetate, M.P. 200–202° C., $[\alpha]_D^{17.5}$ +80° (chloroform, c.=0.59). (Found (percent): C, 75.5; H, 7.5. $C_{29}H_{34}O_5$ requires (percent): C, 75.3; H, 7.4.)

In a similar way, the following compounds were prepared from the appropriate 17α-ester of hydrocortisone or prednisolone.

21-desoxyhydrocortisone -1α-acetate, M.P. 253–256° C., $[\alpha]_D^{21}$ +97° (chloroform). (Found (percent): C, 71.3; H, 8.5. $C_{23}H_{32}O_5$ requires (percent): C, 71.1; H, 8.3.)
21-desoxyhydrocortisone 17α-propionate, M.P. 227–230° C. (dec.), $[\alpha]_D^{21}$ +96° (chloroform). (Found (percent): C, 71.4; H, 8.7. $C_{24}H_{34}O_5$ requires (percent): C, 71.6; H, 8.5.)
21-desoxyprednisolone 17α-propionate, identical with that prepared by the method described in Example 1.

EXAMPLE 3

Prednisolone 21-chloride, M.P. 238–240° C. (dec.), $[\alpha]_D^{20}$ +145° (ethanol, c.=0.78), (2 g.), was added to a stirred ice-cold solution of acetyl nitrate prepared at 0° C. from acetic acid (20 ml.), acetic anhydride (16 ml.), and fuming nitric acid (4 ml.). After 2 hours at 0° C., the solution was poured on ice/water and the pale yellow solid collected by filtration. The air-dried product was chromatographed on a column of Florisil (100 g.). 10% v./v. acetone in hexane eluted material which crystallised from acetone/hexane to give flat rhombs of prednisolone 21-chloride 11β-nitrate, M.P. 192.5–194.5° C., $[\alpha]_D^{25}$ +167° (chloroform, c.=0.42). (Found (percent): C, 59.1; H, 6.2; Cl, 8.3; N, 3.3. $C_{21}H_{26}ClNO_6$ requires (percent): C, 59.5; H, 6.2; Cl, 8.4; N, 3.3.)

A suspension of this compound (1.18 g.) in acetic anhydride (30 ml.) containing p-toluenesulphonic acid (0.3 g.) was stirred overnight at room temperature, poured into ice/water, and the mixture stirred for 1 hour. The product was isolated with chloroform and chromatographed on a column of Florisil (50 g.). 10% v./v. acetone in hexane eluted material which crystallised from acetone/hexane to give elongated plates of prednisolone 17α-acetate 21-chloride 11β-nitrate, M.P. 199–201° C. (dec.), $[\alpha]_D^{26}$ +85° (chloroform, c.=1.03). (Found (percent): C, 59.6; H, 5.9; Cl, 7.5. $C_{23}H_{28}ClNO_7$ requires (percent): C, 59.3; H, 6.1; Cl, 7.6.)

A solution of this compound (0.4 g.) in glacial acetic acid (40 ml.) was stirred with zinc dust (4 g.) for 5 minutes, filtered, and the filtrate evaporated to a low bulk in vacuo. Dilution with water and isolation with chloroform gave a mixture which was separated by preparative thin layer chromatography on Kieselgel G with 5% v./v. methanol in chloroform as solvent. The least mobile component was eluted from the adsorbent with ethyl acetate and crystallised from methanol to give elongated prisms of 21-desoxyprednisolone 17α-acetate, M.P. 259–261° C., $[\alpha]_D^{26}$ +34° (chloroform, c.=0.44). (Found (percent): C, 71.45; H, 7.9. $C_{23}H_{30}O_5$ requires (percent): C, 71.5; H, 7.8.)

EXAMPLE 4

In a similar way to that described in Example 2, prednisolone 17α-butyrate, M.P. 217–219° C., $[\alpha]_D^{22}$ +1.2° (dioxan, c.=0.825), was converted into prednisolone 17α-butyrate 21-methanesulphonate, M.P. 120–123° C., $[\alpha]_D^{26}$ +26° (dioxan, c.=1.4). (Found (percent): C, 61.0; H, 7.2. $C_{26}H_{36}O_8S$ requires (percent): C, 61.4; H, 7.1.)

In a similar way to that described in Example 2, this compound was converted into 21-desoxyprednisolone 17α-butyrate which crystallised from acetone/hexane as prisms, M.P. 232–235° C., $[\alpha]_D^{21}$ +36° (chloroform, c.=0.3). (Found (percent): C, 72.2; H, 8.3. $C_{25}H_{34}O_5$ requires (percent): C, 72.45; H, 8.3.)

Similarly, prednisolone 17α-propionate was converted via prednisolone 21-methanesulphonate 17α-propionate, M.P. 135–137° C. (dec.), into 21-desoxyprednisolone 17α-propionate.

EXAMPLE 5

A mixture of glacial acetic acid (94 ml.) and acetic anhydride (94 ml.) was cooled to 0° C., and stirred for 15 minutes during the addition of fuming nitric acid (18.8 ml.) and left to stand for a further 15 minutes. Prednisolone 21-acetate (10.5 g.) was added and the mixture was stirred for 2½ hours at 0° C. The solution was poured on ice and the product was isolated with methylene chloride. It was crystallised from benzene to give prednisolone 21-acetate 11β-nitrate, M.P. 198–201° C. (dec.), $[\alpha]_D^{16}$ +156.5° (dioxan, c.=1.2). (Found (percent): C, 61.9; H, 6.7. $C_{23}H_{29}NO_8$ requires (percent): C, 61.7; H, 6.5.)

Prednisolone 21-acetate 11β-nitrate (500 mg.) was added to a solution of potassium cyanide (20 mg.) in methanol (5 ml.) and the suspension was left to stand at room temperature with occasional shaking. After 3 hours, solution was complete and it was left to stand overnight. The solution was neutralised with acetic acid and diluted with water (5 ml.) to give hydrated crystals of prednisolone 11β-nitrate, M.P. 172–173° C., (dec.), $[\alpha]_D$ +145° (chloroform). (Found (percent): C, 61.3; H, 7.1. $C_{21}H_{27}NO_7\cdot\frac{1}{2}H_2O$ requires (percent): C, 60.9; H, 6.8.)

Prednisolone 11β-nitrate (200 mg.) was dissolved in 2,6-lutidine (2 ml.), methanesulphonyl chloride (0.1 ml.) was added and the mixture was left to stand for 1 hour at room temperature. The mixture was poured into N-hydrochloric acid (50 ml.), the solid which separated was collected, washed with water, dried and crystallised from benzene to give prednisolone 21-methanesulphonate 11β-nitrate, identical with that described in Example 1.

EXAMPLE 6

21 - desoxyprednisolone 11β - nitrate 17α - propionate (71.8 g.), prepared as in Example 1, was dissolved in methylene chloride (3600 ml.) and glacial acetic acid (360 ml.) was added. After cooling to 3° C., zinc dust (360 g.) was added portionwise over 20 minutes with stirring which was continued for a further 20 minutes after the addition of the zinc. The mixture was filtered, the filtrate was washed with aqueous potassium carbonate solution and water, then dried and evaporated to 100 ml. Acetone (350 ml.) was added, 200 ml. of solvent was distilled off and the concentrate was cooled to 5° C., seeded and diluted with hexane (250 ml.) when crystallisation started. The crystals were collected, washed with ether and light petroleum (B.P. 40–60° C.) to give 21-desoxyprednisolone 17α-propionate, M.P. 227–229° C., identical with that produced by the method of Example 1.

EXAMPLE 7

21 - desoxyprednisolone 11β - nitrate 17α - propionate (445 mg.), prepared as in Example 1, was suspended in dry methanol (45 ml.) and the suspension was added to a pre-reduced suspension of palladium oxide (80 mg.) in dry methanol (10 ml.). The mixture was shaken under hydrogen when 16 ml. was absorbed in 30 minutes. The mixture was filtered, and the filtrate was evaporated to give a gum which was shown to contain 21-desoxyprednisolone 17α-propionate by thin layer chromatography.

EXAMPLE 8

A solution of 21-desoxyprednisolone 11β-nitrate 17α-propionate (0.5 g.) in methylene chloride (25 ml.) was stirred at reflux temperature with tin (2.5 g.) and concentrated hydrochloric acid for 5½ hours. Thin layer chromatography indicated an approximately 40% yield of 21-desoxyprednisolone 17α-propionate.

EXAMPLE 9

A suspension of zinc amalgam (2.5 g.) in dioxan (20 ml.) was stirred with cooling until freezing began, cooling was stopped, 21-desoxyprednisolone 11β-nitrate 17α-propionate (0.5 g.) and water (0.5 ml.) were added, and the mixture was stirred at 8–10° C. for 1 hour. Thin layer chromatograms indicated that the major product was 21-desoxyprednisolone 17α-propionate.

EXAMPLE 10

Aluminium turnings (5 g.) were amalgamated with 5% aqueous mercuric chloride solution and suspended in anhydrous methanol. A suspension of 21-desoxyprednisolone 11β-nitrate 17α-propionate (1 g.) in methanol (20 ml.) was added. Reaction was initiated by addition of water (0.75 ml.) and dioxan (20 ml.) and the mixture was refluxed for 1 hour. Thin layer chromatograms indicated partial conversion into 21-desoxyprednisolone 17α-propionate.

EXAMPLE 11

Dimethylformamide (10 ml.) and 21-desoxyprednisolone 11β-nitrate 17α-propionate (0.5 g.) were added to a mixture of granulated zinc (2.5 g.) and glacial acetic acid (10 ml.). The temperature rose from 5° C. to 37° C. and, after 30–40 minutes, thin layer chromatograms indicated a 60% conversion into 21 - desoxyprednisolone 17α-propionate.

EXAMPLE 12

Prednisolone 21-methanesulphonate 11β-nitrate (5. g.), prepared as in Example 1, sodium iodide (5 g.) and acetone (60 ml.) were refluxed for 45 minutes and the cooled mixture was poured into water. The mixture was extracted with methylene chloride, the clear organic phase was collected, washed with water, dried and evaporated to about 10 ml. The solution crystallised on cooling to 0° C. to give prednisolone 21-iodide 11β-nitrate, M.P. 175–176° C. (dec.), $[\alpha]_D^{23}$ +138° (dioxan). (Found (percent): C, 49.3; H, 5.4; I, 24.3; N, 2.5. $C_{21}H_{26}INO_6$ requires (percent): C, 48.9; H, 5.1; I, 24.6; N, 2.7.)

This compound (100 mg.) in dioxan (5 ml.) was stirred with 10% aqueous sodium hydrogen sulphite (2 ml.) for 1½ hours at room temperature, and then poured into water. The mixture was extracted with methylene chloride, the extract was washed and dried and the solvent was evaporated. The residue was crystallised from ether to give 21-desoxyprednisolone 11β-nitrate, M.P. 142–147° C., identical with material prepared as described in Example 1.

This compound was converted into 21-desoxyprednisolone 17α-propionate as described in Example 1.

EXAMPLE 13

Prednisolone 21-methanesulphonate 11β-nitrate (1 g.), prepared as in Example 1, sodium bromide (1 g.) and acetone (12 ml.) were refluxed for 3½ hours, the cooled mixture was poured into water and extracted with chloroform. The extract was dried, evaporated and the residue was crystallised from chloroform/methanol to give prednisolone 21-bromide 11β-nitrate, M.P. 189–190° C., $[\alpha]_D^{21}$ + 149° (chlorofrom), identical with that prepared by the method of Example 14. It was converted into 21-desoxyprednisolone 17α-propionate as described in Example 14.

EXAMPLE 14

Prednisolone 21-bromide (2 g.) was added to acetyl nitrate prepared from acetic acid (20 ml.), acetic anhydride (16 ml.) and fuming nitric acid (4 ml.) at 0° C., the mixture was stirred at 0–9° C. for 1 hour then warmed to room temperature and stirred for 2 hours. The mixture was poured into water, extracted with methylene chloride, the extract was washed with aqueous sodium bicarbonate solution, then water, and dried. The solvent was evaporated and the residue was dissolved in chloroform and percolated through a column of Florisil. The eluate was evaporated and the residue was crystallised from methanol to give prednisolone 21 - bromide 11β-nitrate, M.P. 189–190° C., $[\alpha]_D^{21}$ +149° (chloroform). (Found (percent): C, 53.7; H, 5.5; Br, 17.3; N, 3.2. $C_{21}H_{26}BrNO_6$ requires (percent): C, 53.9; H, 5.6; Br, 17.1; N, 3.0.).

This compound (884 mg.) was added to p-toluenesulphonic acid (18 mg.) in propionic anhydride (1.8 ml.), chloroform (13 ml.) was added and the mixture was refluxed overnight. The mixture was cooled, stirred for 1½ hours with water (8 ml.) and ammonium hydroxide (SG 0.88, 4 ml.) and the solvent layer was collected. It was washed with water, dried, evaporated and the residue was crystallised from acetone to give prednisolone 21-bromide 11β-nitrate 17α-propionate, M.P. 198–200° C. (dec.), $[\alpha]_D^{21}$ +101° (chloroform). (Found (percent): C, 55.1; H, 5.7; Br, 15.5; N, 2.6. $C_{24}H_{30}BrNO_7$ requires (percent): C, 55.0; H, 5.8; Br, 15.2; N, 2.7.)

This compound (200 mg.) in methylene chloride (8 ml.) was stirred with zinc dust (1 g.) at 5–10° C. during the dropwise addition of a solution of acetic acid (0.27 ml.) in methylene chloride (2 ml.). After 10 minutes at 10° C., the solution was kept at room temperature for 10 minutes and filtered. The filtrate was washed with dilute aqueous sodium bicarbonate, then water, dried and evaporated. The residue was purified by preparative layer chromatography and crystallised from methylene chloride/ether to give 21-desoxyprednisolone 17α-propionate, M.P. 229–231° C., identical with that prepared by the method described in Example 1.

EXAMPLE 15

A mixture of p-toluenesulphonic acid (100 mg.), propionic anhydride (10 ml.) chloroform (70 ml.) and prednisolone 21-methanesulphonate 11β-nitrate (5 g.), prepared as in Example 1, was refluxed for 3 days, cooled and stirred for 1½ hours with water (40 ml.) and ammonium hydroxide (SG 0.88, 20 ml.) The solvent layer was collected, washed with water, dried and evaporated. The residual gummy prednisolone 21-methanesulphonate 11β-nitrate 17α-propionate (6.6 g.) in methylene chloride (265 ml.) was stirred at 5° C. with zinc dust (33 g.) during the dropwise addition of acetic acid (9 ml.) in methylene chloride (25 ml.). After 30 minutes at 10° C. the mixture was warmed to room temperature, left at room temperature for a short time, filtered and the filtrate was washed with aqueous sodium bicarbonate and dried. The solvent was evaporated and the residue was crystallised from methanol to give prednisolone 21-methanesulphonate 17α-propionate, M.P. 134–137° C., identical with that prepared by the method of Example 4.

A solution of prednisolone 21-methanesulphonate 17α-propionate (1 g.) in dimethylformamide (12 ml.) was heated on the steam-bath with sodium bromide (1 g.) for 7 hours, cooled, poured into water, and extracted with methylene chloride. The extract was percolated through Florisil (registered trademark). Elution was continued with 20% acetone in chloroform (200 ml.). The total eluate was evaporated and the residue was crystallised from acetone to give prednisolone 21-bromide 17α-propionate, M.P. 204–205° C. (dec.), $[\alpha_D^{23}$ +82° (chloroform).

This compound (200 mg.) in methylene chloride (16 ml.) was stirred with zinc dust (2 g.) at 5–10° C. during the dropwise addition of glacial acetic acid (0.54 ml.) in methylene chloride (4 ml.). After a further 10 minutes at 10° C. the mixture was warmed to room temperature for 10 minutes, cooled, filtered and the filtrate was washed with aqueous sodium bicarbonate solution and then water. The dried solution was evaporated and the residue was crystallised from acetone/hexane to give 21-desoxyprednisolone 17α-propionate identical with authentic material.

EXAMPLE 16

A solution of prednisolone (20 g.) in dry pyridine (100 ml.) was stirred at 0–2° C. during the addition of ethanesulphonyl chloride (8.4 ml.) during 20 minutes. After a further 4 hours at 0–5° C. the solution was diluted with water (250 ml.), stirred for 10 minutes and the solid was collected, washed with water and dried. It was recrystallised from chloroform/methanol to give prednisolone 21-ethanesulphonate, M.P. 196° (dec.), $[\alpha]_D^{23}$ +115° (5% methanol in chloroform). This compound (20 g.) was added to acetyl nitrate prepared from fuming nitric acid (40 ml.), acetic anhydride (160 ml.) and glacial acetic acid (200 ml.), and stirred at 0–3° C. for 3½ hours. The solution was slowly poured into ice-water (2000 ml.), the mixture was stirred for 15 minutes and left to stand overnight at 0° C. The solid was collected, washed with water and dissolved in methylene chloride (500 ml.). The extract was washed with aqueous sodium bicarbonate, then water, concentrated to 150 ml. and diluted with benzene (300 ml.). The solution was distilled (to head temp. 75° C.) and the crystals which separated were collected, washed with benzene and air-dried to give a benzene solvate of prednisolone 21-ethanesulphonate 11β-nitrate, M.P. 190–191° C. (dec.), $[\alpha]_D$ +145° (chloroform). (Found (percent): C, 56.1; H, 6.4; N, 2.2. $C_{22}H_{31}NO_9S,\frac{1}{6}C_6H_6$ requires (percent): C, 56.5; H, 6.3; N, 2.7.)

A mixture of this compound (1 g.), sodium iodide (2 g.) and glacial acetic acid (20 ml.) was stirred at room temperature for 1 hour, the iodine was discharged with 5% aqueous sodium bisulphite and the solution was diluted with ice-water to give a crystalline solid. The solid was collected, washed with water and dried to give 21-deoxyprednisolone 11β-nitrate, M.P. 145–146° C.

This compound was converted into 21-desoxyprednisolone 11β-nitrate 17α-propionate and finally reduced to 21-desoxyprednisolone 17α-propionate as described in Example 1.

EXAMPLE 17

A solution of p-toluenesulphonic acid (100 mg.) in benzene (50 ml.) was distilled to a volume of 25 ml., 21-desoxyprednisolone 11β-nitrate (0.5 g.) and propionyl chloride (1 ml.) were added and the mixture was refluxed for 18 hours. The cooled solution was stirred with ammonium hydroxide (SG 0.88, 3 ml.) and water (12 ml.) at room temperature for 30 minutes. The benzene layer was collected, washed with water, evaporated to dryness and the residue recrystallised from ethyl methyl ketone to give 21-desoxyprednisolone 11β-nitrate 17α-propionate, M.P. 207–209° C. (dec.), which was identical with the material prepared by the process of Example 1.

EXAMPLE 18

Prednisolone 21-iodide 11β-nitrate (2 g.), prepared as described in Example 12, was added to a solution of p-toluenesulphonic acid (40 mg.) in propionic anhydride (40 ml.), the mixture was diluted with chloroform (28 ml.) and then refluxed for 21 hours. The cooled solution was stirred with water (16 ml.) and ammonium hydroxide (SG 0.88, 8 ml.) for 15 minutes, the chloroform layer was collected, washed with aqueous sodium bicarbonate, aqueous sodium bisulphite, then water, and evaporated to give crude prednisolone 21-iodide 11β-nitrate 17α-propionate.

This crude intermediate (0.8 g.) in dioxan (40 ml.) was stirred for 4 hours with 10% aqueous sodium bisulphite (16 ml.). The solution was diluted with water (50 ml.), seeded and the crystals were collected, washed with water and dried. The compound was recrystallised from methylene chloride/acetone to give 21-desoxyprednisolone 11β-nitrate 17α-propionate, M.P. 211–212° C. (dec.). This compound was reduced to 21-desoxyprednisolone 17α-propionate as described in Example 1. The crude intermediate was also reduced to 21-desoxyprednisolone 17α-propionate in a single stage process using zinc dust and acetic acid.

EXAMPLE 19

A mixture of trifluoroacetic anhydride (6 ml.) and cyclopentanecarboxylic acid (4 ml.) was left to stand at room temperature for 30 minutes and then stirred with a solution of 21-desoxyprednisolone 11β-nitrate (2 g.) in chloroform (28 ml.) for 18 hours. The cooled solution was treated with ammonium hydroxide (SG 0.88, 15 ml.) and water (30 ml.) for 30 minutes, left to stand at room temperature for 1 hour and the solvent layer was collected. It was washed with aqueous sodium bicarbonate then water, dried and evaporated. The residual gum was purified by adsorption on Florisil and elution with chloroform, the extract being evaporated to give a gum.

A solution of this gum (2 g.) in methylene chloride (10 ml.) was stirred at 7.5° C. with zinc dust (10 g.) during the addition of acetic acid (2.7 ml.) in methylene chloride (10 ml.) over 10 minutes. After stirring for 20 minutes at 10–13° C., the mixture was filtered, the solvent layer was collected, washed with aqueous sodium bicarbonate, then water, dried and evaporated. The product was purified by adsorption on Florisil, eluting with 10% acetone in chloroform and concentrating the eluate to 3–4 ml. The concentrate was diluted with ether and the crystals which separated were collected and recrystallised from acetone to give 21-desoxyprednisolone 17α-cyclopentanecarboxylate, M.P. 265–267° C., $[\alpha]_D^{21}$ +30° (chloroform). (Found (percent): C, 73.6; H, 8.5. $C_{27}H_{36}O_5$ requires (percent): C, 73.6; H, 8.2.)

In a similar way, using the appropriate mixed anhydride of trifluoroacetic acid there was prepared:

21-desoxyprednisolone 17α - cyclohexanecarboxylic 11β-nitrate. (Found (percent): C, 66.7; H, 7.5; N, 2.5. $C_{28}H_{37}NO_7$ requires (percent): C, 67.3; H, 7.5; N, 2.8.)

21-desoxyprednisolone 17α-cyclohexanecarboxylate, M.P. 261–265° C. (dec.), $[\alpha]_D^{23}$ +32° (chloroform). (Found (percent): C, 74.1; H, 8.1. $C_{28}H_{38}O_5$ requires (percent): C, 74.0; H, 8.4.)

21-desoxyprednisolone 11β-nitrate 17α-propionate and 21-desoxyprednisolone 17α-propionate identical with the product made by the process described in Example 1.

EXAMPLE 20

A solution of p-toluenesulphonic acid (1.35 g.) in propionic anhydride (135 ml.) was diluted with chloroform (945 ml.), 21-desoxyprednisolone 11β-nitrate (67.5 g.) was added and the mixture was refluxed for 16 hours. The cooled solution was added to ammonium hydroxide (SG 0.88, 270 ml.) and water (540 ml.) cooled in ice, stirred for 4 hours and the organic phase was collected. It was washed with aqueous sodium bicarbonate then water, dried and evaporated. The residue was dissolved in methylene chloride (500 ml.), acetone (500 ml.) was added and the mixture was distilled until a thick slurry remained. The mixture was cooled, the crystals were collected, washed with acetone then ether and dried to give 21-desoxyprednisolone 11β-nitrate 17α-propionate, identical with the material produced by the method described in Example 1.

The compound was converted into 21-desoxyprednisolone 17α-propionate as described in Example 1.

EXAMPLE 21

A mixture of 21-desoxyhydrocortisone 17α-propionate (418 mg.), prepared as in Example 1, chloranil (765 mg.) and t-butanol (28 ml.) was refluxed for 24 hours, cooled, filtered and the filtrate evaporated to dryness in vacuo. The residue was dissolved in chloroform, washed with dilute sodium hydroxide solution and water, dried and evaporated to dryness. The residue was purified by preparative layer chromatography and crystallised from ethyl acetate to give 6-dehydro-21-desoxyhydrocortisone 17α- propionate, M.P. 255–258° C., $[\alpha]_D^{21}$ +60° (chloroform). (Found (percent): C, 72.3; H, 8.3. $C_{24}H_{32}O_5$ requires (percent): C, 72.0; H, 8.1.)

EXAMPLE 22

A mixture of 6 - dehydro - 21 - desoxyhydrocortisone 17α-propionate (312 mg.), prepared as in Example 21, 2,3 - dichloro - 5,6 - dicyanobenzoquinone (312 mg.) and dioxan (13 ml.) was refluxed for 24 hours, cooled, filtered and the residue washed with chloroform. The filtrate was adsorbed on Florisil, eluted with methylene chloride and then 10% acetone in methylene chloride and the eluate was evaporated. The residue was purified by preparative layer chromatography and crystallised from methanol to give 6 - dehydro - 21 - desoxyprednisolone 17α-propionate. M.P. 263–265° C., $[\alpha]_D^{21}$ −2.7° (chloroform). (Found (percent): C, 72.8; H, 7.4. $C_{24}H_{30}O_5$ requires (percent): C, 72.4; H, 7.6.)

EXAMPLE 23

A mixture of 21 - desoxy - 16α - methylhydrocortisone 17α-propionate (229 mg.), prepared as in Example 1, 2,3 - dichloro - 5,6 - dicyanobenzoquinone (229 mg.), oxalic acid (23 mg.), trichloroethylene (9.2 ml.) and ethyl acetate was refluxed for 23 hours, cooled, washed with dilute sodium hydroxide solution then water, dried and evaporated. The residue was purified by preparative layer chromatography and crystallised from ethyl acetate to give 21 - desoxy - 16α - methylprednisolone 17α-propionate, M.P. 258–265° C., $[\alpha]_D^{21}$ +23° (chloroform). (Found (percent): C, 72.4; H, 8.0. $C_{25}H_{34}O_5$ requires (percent): C, 72.5; H, 8.3.)

EXAMPLE 24

1,9(11) - bisdehydro - 17α - hydroxyprogesterone (2 g.) was added to a solution of p-toluenesulphonic acid (40 mg.) in propionic anhydride (4 ml.) diluted with chloroform (28 ml.), and the mixture was refluxed overnight. The cooled solution was stirred with water (16 ml.) and ammonium hydroxide (SG 0.88, 8 ml.) for 1½ hours, the organic phase was collected, washed with aqueous sodium bicarbonate solution and then water and dried. The solvent was evaporated and the residual oil was crystallised from methanol to give 1.9(11) - bisdehydro - 17α - propionoxy - progesterone, M.P. 199–203° C., $[\alpha]_D^{24}$ −30.5 (chloroform). (Found (percent): C, 75.4; H, 7.5. $C_{24}H_{30}O_4$ requires (percent): C, 75.4; H, 7.9.)

A solution of this compound (1.46 g.) in methylene chloride (25 ml.) and t-butanol (40 ml.) was treated successively at 27° C. with a solution of 72% perchloric acid (0.6 ml.) in water (3 ml.) and a solution of N-bromacetamide (0.65 g.) in t-butanol (10 ml.). After 15 minutes a solution of sodium sulphite heptahydrate (1.6 g.) in water (8 ml.) was added, and the mixture was poured into water. The product was extracted into methylene chloride, the solvent was evaporated at <40° C. and the residue was recrystallised from acetone/hexane to give an acetone solvate of 9α-bromo-21-desoxyprednisolone 17α-propionate M.P. 191° C. (dec.), $[\alpha]_D^{23}$ +71° (chloroform). (Found (percent): C, 60.3; H, 7.2; Br, 14.4. $C_{24}H_{31}BrO_5$. ⅔ $(C_3H_6O)$ requires (percent): C, 60.4; H, 7.1; Br, 14.4.)

A solution of the above solvated compound (520 mg.) and butane-1-thiol (1.1 ml.) in dimethylsulphoxide (17 ml.) was deoxygenated by blowing nitrogen through the solution and then stirred with chromous acetate (700 mg.) under nitrogen overnight. The purple solution was poured into ice-water (200 ml.) and extracted with methylene chloride. The extract was washed with dilute aqueous sodium bicarbonate and then water and dried. The solvent was evaporated and the residual oil was triturated with ether to give a yellow solid. This was purified by preparative thin layer chromatography and finally crystallised from methylene chloride/ether to give 21-desoxyprednisolone 17α-propionate, M.P. 231–232.5° C., identical with that prepared by the method described in Example 1.

EXAMPLE 25

A mixture of 1,9(11) - bisdehydro - 17α - hydroxyprogesterone (2.5 g.), methylene chloride (50 ml.) and t-butanol (80 ml.) was stirred at 27° C. and treated successively with 72% perchloric acid (1.2 ml.) in water (6 ml.), and N-bromacetamide (1.3 g.) in t-butanol (20 ml.). After 15 minutes, sodium sulphite heptahydrate (3.2 g.) in water (16 ml.) was added and the mixture was poured into water. The solid was collected, washed and dried to give 21-desoxy-9α-bromoprednisolone, M.P. 203° C. (dec.).

This compound (960 mg.) was added to a solution of p-toluenesulphonic acid (20 mg.) in propionic anhydride (2 ml.) and chloroform (14 ml.) and the mixture was refluxed for 18 hours. The suspension was filtered, the filtrate was evaporated in vacuo and light petroleum (B.P. 40–60° C., 90 ml.) was added to the residue. The gummy solid was collected, purified by preparative thin layer chromatography and crystallised from ethyl acetate to give 21-desoxy-9α-bromoprednisolone 17α-propionate, M.P. 180° C. (dec)., $[\alpha]_D^{21}$ +80.5° (chloroform). (Found (percent): C, 60.4; H, 6.2; Br, 16.6. $C_{24}H_{31}BrO_5$ requires (percent): C, 60.1; H, 6.5; Br, 16.7.) It was converted into 21-desoxyprednisolone 17α-propionate as described in Example 24.

EXAMPLE 26

A mixture of prednisolone 21-methanesulphonate 17α-propionate (100 mg.), sodium iodide (100 mg.) and dimethylformamide (5 ml.) was refluxed for 30 minutes, evaporated to dryness in vacuo and the residue was triturated with 5% aqueous sodium metabisulphite. The solid was collected, dried and the major component, 21-desoxyprednisolone 17α-propionate, M.P. 226–229° C., was isolated by preparative layer chromatography and crystallisation from ether.

EXAMPLE 27

A mixture of prednisolone 21-methanesulphonate 17α-propionate (847 mg.), sodium iodide (847 mg.) and acetone (20 ml.) was refluxed for 70 hours, cooled and poured into water. The mixture was extracted with methylene chloride, and the extract was washed, dried and evaporated. The residual gum was purified by preparative layer chromatography and crystallised from acetone/hexane to give prednisolone 21-iodide 17α-propionate. M.P. 163–165° C. (dec.), $[\alpha]_D^{23}$ −104° (chloroform). (Found (percent): C, 55.5; H, 5.9; I, 24.1. $C_{24}H_{31}IO_5$ requires (percent): C, 54.8; H, 5.91; I, 24.1.)

A solution of this compound (40 mg.) in dioxan (2 ml.) was treated with 10% aqueous sodium metabisulphite (0.8 ml.) and left to stand for 2 hours. The solution was diluted with water, the solid which separated was collected and recrystallised from ether to give 21-desoxyprednisolone 17α-propionate, identical with authentic material.

EXAMPLE 28

Prednisolone 21-iodide 17α-propionate (50 mg.), prepared as in Example 27, in methylene chloride (2 ml.) was stirred at 10–11° C. with zinc dust (250 mg.) during the dropwise addition of glacial acetic acid (0.07 ml.) in methylene chloride (0.5 ml.). After 10 minutes at 6–9° C. the mixture was allowed to warm to room temperature, filtered and the filtrate was washed with aqueous sodium bicarbonate solution, then water and dried. The solvent was evaporated and the residue was crystallised from acetone/hexane to give 21-desoxyprednisolone 17α-propionate identical with authentic material.

EXAMPLE 29

A water miscible cream was prepared containing the following ingredients (percent w./w.):

| | Percent |
|---|---|
| 21-desoxyprednisolone 17α-butyrate | 0.1 |
| White soft paraffin | 15.0 |
| Cetomacrogol emulsifying wax | 9.0 |
| Liquid paraffin | 6.0 |
| Chlorocresol | 0.1 |
| Water | 69.8 |

EXAMPLE 30

An ointment was prepared containing the following ingredients (percent w./w.):

| | Percent |
|---|---|
| 21-desoxyprednisolone 17α-propionate | 0.1 |
| Methyl p-hydroxybenzoate | 0.02 |
| Butyl p-hydroxybenzoate | 0.18 |
| Wool fat | 10.0 |
| White soft paraffin | To 100 |

EXAMPLE 31

An oil-in-water cream was prepared containing the following ingredients:

| | Percent |
|---|---|
| 21-desoxyprednisolone 17α-propionate | 0.1 |
| Cetamacrogol 1000 | 1.8 |
| Cetostearyl alcohol | 7.2 |
| White soft paraffin | 15.0 |
| Liquid paraffin | 6.0 |
| Sodium citrate | 0.7 |
| Citric acid | 0.5 |
| Chlorocresol | 0.15 |
| Purified water | 68.55 |

EXAMPLE 32

Antibacterial oil-in-water creams were prepared with similar compositions to that of the cream described in Example 31, but in which:

(a) 3% of the water was replaced by 3% of 5-chloro-8-hydroxy-7-iodoquinoline.
(b) 0.1% of the water was replaced by 0.1% of 2-bromo-2-nitropropane-1,3-diol.
(c) 1.5% of the water was replaced by 1.5% of 5,7-dichloro-8-hydroxyquinoline.
(d) 0.75% of the water was replaced by 0.75% of 5,7-dichloro-8-hydroxyquinoline.
(e) 0.5% of the water was replaced by 0.5% of neomycin sulphate.

EXAMPLE 33

An ointment was prepared containing the following ingredients:

| | Percent |
|---|---|
| 21-desoxyprednisolone 17α-propionate | 0.1 |
| Wool fat | 10.0 |
| White soft paraffin | To 100 |

EXAMPLE 34

Antibacterial ointments were prepared with similar compositions to that of the ointment described in Example 40, and containing also 0.1% of 2-bromo-2-nitropropane-1,3-diol, 0.75% or 1.5% of 5,7-dichloro-8-hydroxyquinoline, 3% of 5-chloro-8-hydroxy-7-iodoquinoline or 0.5% of neomycin sulphate.

EXAMPLE 35

An ear drop was prepared by dissolving 21-desoxyprednisolone 17α-propionate 0.1% w./w. in propylene glycol.

EXAMPLE 36

An aerosol spray was prepared by dissolving 21-desoxyprednisolone 17α-propionate in industrial methylated spirit and hexylene glycol and adding chlorofluoroalkane propellants to give a composition containing the following ingredients:

| | Percent |
|---|---|
| 21-desoxyprednisolone 17α-propionate | 0.1 |
| Industrial methylated spirit | 29.9 |
| Hexylene glycol | 10.0 |
| Freon 11 | 30.0 |
| Freon 12 | 30.0 |

EXAMPLE 37

An aerosol quick-breaking foam preparation was prepared containing the following ingredients:

| | Percent |
|---|---|
| 21-desoxyprednisolone 17α-propionate | 0.1 |
| Polawax | 0.3 |
| Industrial methylated spirit | 49.6 |
| Hexylene glycol | 10.0 |
| Purified water | 30.0 |
| Freon | 6.0 |
| Freon 114 | 4.0 |

We claim:
1. A process for preparing a compound of Formula I

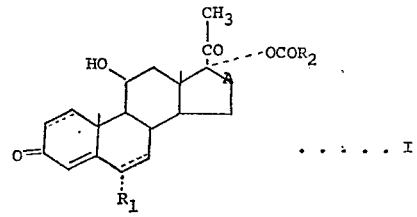

. . . . . I in which the bonds marked ═══ are each selected from the group consisting of single and double bonds; A is selected from the group consisting of

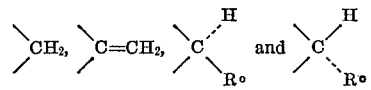

wherein R° is selected from the group consisting of acyloxy, fluorine, chlorine or methyl; $R_1$ is selected from the group consisting of hydrogen, fluorine, methyl and fluorinated methyl; and $R_2$ is selected from the group consisting of alkyl, halogenated alkyl, alkoxyalkyl, aralkyl, cycloalkyl, alkenyl, aryl and heterocyclic; which process comprises treating a compound of Formula II

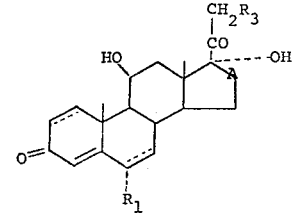

. . . . . II wherein $R_3$ is selected from the group consisting of chlorine, bromine, alkanesulphonyloxy and arenesulphonyloxy with acetyl nitrate to give a compound of Formula III

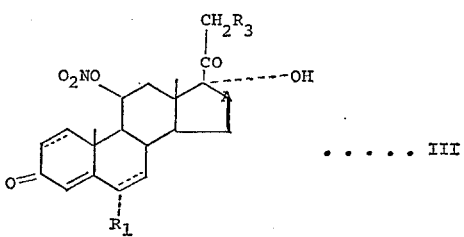

. . . . . III and thereafter subjecting the compound of Formula III to a series of reactions selected from the group consisting of (a) reducing $R_3$ to hydrogen to give a compound of Formula IV

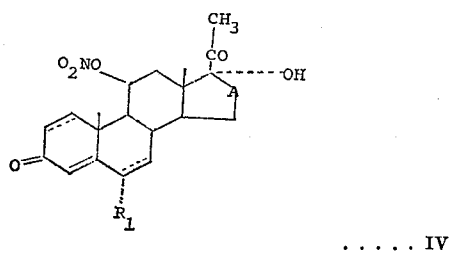

..... IV treating the compound of Formula IV with an acylating agent selected from the group consisting of acid anhydrides of Formula $(R_2CO)_2O$, acid halides of formula $R_2COX$ in which X is selected from the group consisting of chlorine and bromine, and acids of formula $R_2COOH$ in the presence of trifluoroacetic anhydride, to give a compound of Formula V

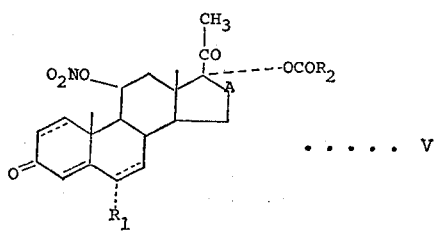

..... V and reducing the 11β-nitrate group compound of Formula V to give a compound of Formula I;

(b) treating the compound of Formula III with an acylating agent selected from the group consisting of acid anhydrides of formula $(R_2CO)_2O$, acid halides of formula $R_2COX$ in which X selected from the group consisting of chlorine and bromine, and acids of formula $R_2COOH$ in the presence of trifluoroacetic anhydride to give a compound of Formula VI

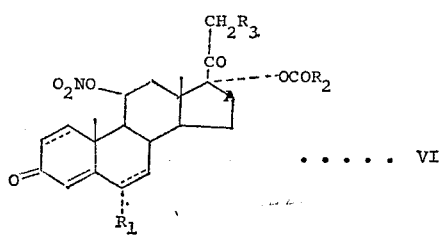

..... VI reducing the 11β-nitrate group of the compound of Formula VI to give a compound of Formula VII

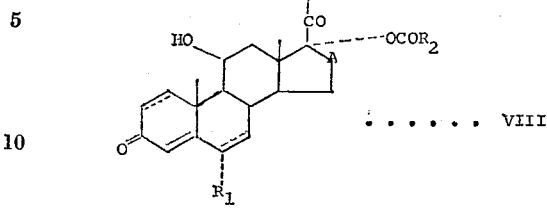

..... VIII and reducing $R_3$ to hydrogen to give a compound of Formula I; and (c) treating the compound of Formula III with an acylating agent selected from the group consisting of acid anhydrides of formula $(R_2CO)_2O$, acid halides of formula $R_2COX$ in which X is selected from the group consisting of chlorine and bromine, and acids of formula $R_2COOH$ in the presence of trifluoroacetic anhydride to give a compound of Formula VI, reducing $R_3$ to hydrogen to give a compound of Formula V, and reducing the 11β-nitrate group of the compound of Formula V to give a compound of Formula I.

2. A process as claimed in claim 1 wherein the reduction of $R_3$ to hydrogen and reduction of the 11β-nitrate group in series (b) and (c) take place simultaneously.

References Cited

UNITED STATES PATENTS

| | | | |
|---|---|---|---|
| 2,892,851 | 6/1959 | Bergstrom et al. | 260—397.45 |
| 3,215,713 | 11/1965 | Barton | 260—397.4 |
| 3,152,154 | 10/1964 | Ercoli et al. | 260—397.45 |
| 3,376,193 | 4/1968 | Elks et al. | 167—65 |
| 3,440,252 | 4/1969 | Weir | 260—397.45 |
| 3,297,729 | 1/1967 | Mancini et al. | 260—397.4 |

OTHER REFERENCES

Gardi et al., Gazz. Chem. Ital. vol. 96, pages 1115–24 (1966).

ELBERT L. ROBERTS, Primary Examiner

U.S. Cl. X.R.

424—243